(12) United States Patent
Tetzlaff (10) Patent No.: US 9,730,102 B2
(45) Date of Patent: Aug. 8, 2017

(54) METHODS AND ARRANGEMENTS FOR PACKET FLOWS IN WIRELESS NETWORKS

(71) Applicant: Intel Corporation, Santa Clara, CA (US)

(72) Inventor: Thomas A. Tetzlaff, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/730,983

(22) Filed: Dec. 29, 2012

(65) Prior Publication Data

US 2013/0215751 A1 Aug. 22, 2013

Related U.S. Application Data (60) Provisional application No. 61/600,040, filed on Feb. 17, 2012.

(51) Int. Cl.
*H04W 28/06* (2009.01)
*H04L 12/741* (2013.01)

(52) U.S. Cl.
CPC ............ *H04W 28/06* (2013.01); *H04L 45/74* (2013.01); *H04W 28/065* (2013.01)

(58) Field of Classification Search
CPC ........... H04L 29/12839; H04L 61/6022; H04L 12/4625; H04L 12/4633; H04L 2212/0025;

(Continued)

(56) References Cited

U.S. PATENT DOCUMENTS 7,920,590 B2   4/2011   Le et al.
8,780,881 B2   7/2014   Venkatachalam et al.
(Continued)

FOREIGN PATENT DOCUMENTS

CN   1700677 A   11/2005
EP   1775899 A2   4/2007
(Continued)

OTHER PUBLICATIONS

Extended European Search Report Received for the European Patent Application No. 13748906.8, mailed on Sep. 14, 2015, 6 pages.

(Continued)

*Primary Examiner* — Sai Aung
(74) *Attorney, Agent, or Firm* — Kacvinsky Daisak Bluni PLLC (57) ABSTRACT

Logic may compress wireless communications frames and communicate compressed frames that do not include the duplicative bit sequences within the packet flow. Logic may include the compressed frames in flow frames. Logic may generate, encode, transmit, decode, parse, and interpret flow frames after a packet flow is created. Flow frames may comprise a flow frame control field, a compressed frame, and a frame sequence check. Logic may decompress the compressed flow frame based upon flow decompression rules associated with a flow index of the flow frame. Flow frames may include a duration field to set the network allocation vectors of other stations. And the frame sequence check may be generated based upon the entire flow frame.

25 Claims, 4 Drawing Sheets

(58) Field of Classification Search
CPC ......... H04L 47/10; H04L 47/34; H04L 69/22; H04L 69/324
USPC .................. 370/252, 389, 392, 469, 474
See application file for complete search history.

(56) References Cited

U.S. PATENT DOCUMENTS

| | | |
|---|---|---|
| 2002/0142730 A1 | 10/2002 | Hsu |
| 2005/0249222 A1 | 11/2005 | van Kampen et al. |
| 2006/0029099 A1* | 2/2006 | Jang ............... H04W 28/06 370/473 |
| 2009/0067389 A1* | 3/2009 | Lee ................. H04W 74/02 370/336 |
| 2010/0067385 A1* | 3/2010 | Liu ................ H04L 12/4633 370/241.1 |
| 2010/0121971 A1 | 5/2010 | Shao et al. |
| 2010/0142560 A1 | 6/2010 | Sharivker et al. |
| 2010/0217847 A1* | 8/2010 | Cook et al. ................ 709/222 |
| 2010/0220658 A1* | 9/2010 | Taha .................. H04L 47/34 370/328 |
| 2010/0278062 A1* | 11/2010 | Abraham ........... H04W 72/085 370/252 |
| 2011/0019695 A1 | 1/2011 | Wu et al. |
| 2011/0038284 A1 | 2/2011 | Senarath et al. |
| 2011/0173209 A1* | 7/2011 | Fortier ............... H03M 7/3086 707/747 |
| 2011/0222487 A1 | 9/2011 | Sekiya et al. |
| 2011/0317719 A1* | 12/2011 | Vedantham .......... H04W 28/06 370/469 |
| 2012/0087255 A1* | 4/2012 | Ukita et al. ................. 370/252 |
| 2012/0324322 A1 | 12/2012 | Vedantham et al. |
| 2013/0155929 A1 | 6/2013 | Aboul-Magd et al. |
| 2015/0109929 A1 | 4/2015 | Tetzlaff |

FOREIGN PATENT DOCUMENTS

| | | |
|---|---|---|
| EP | 1775899 A3 | 7/2009 |
| JP | 2005-323372 A | 11/2005 |
| JP | 2006/140943 A | 6/2006 |
| JP | 2011-519530 A | 7/2011 |
| JP | 2011-193142 A | 9/2011 |
| WO | 2013/123042 A1 | 8/2013 |

OTHER PUBLICATIONS

Office Action Received for Japanese Application No. 2014-557742, mailed on Aug. 18, 2015, 5 pages of English Translation and 4 pages of Japanese Office Action.

International Preliminary Report on Patentability and Written Opinion received for PCT Patent Application No. PCT/US2013/025928, mailed on Aug. 28, 2014, 9 pages.

International Search Report and Written Opinion received for PCT Patent Application No. PCT/US2013/025928, mailed on Jun. 2, 2013, 15 pages.

Office Action Received for Japanese Application No. 2014-557742, mailed Dec. 15, 2015, 4 pages of English Translation and 4 pages of Japanese Office Action.

Office Action for Chinese Application No. 201380009702.X, dated on May 31, 2016, 4 pages of English Translation and 12 pages of Chinese Office Action.

Lv, Kaiying, "MAC Header Design for Small Data Packet for 802.11ah", Doc.: IEEE 802.11-12/0094r2, Jan. 18, 2012, 12 pages.

Office Action received for Chinese Patent Application No. 201380009702.X, dated on Feb. 15, 2017, 13 pages of Office Action including 3 pages of English Translation.

Office Action received for Japanese Patent Application No. 2016-230494, dated on Feb. 21, 2017, 15 pages of Japanese Office Action including 8 pages of English Translation.

* cited by examiner

METHODS AND ARRANGEMENTS FOR PACKET FLOWS IN WIRELESS NETWORKS

BACKGROUND

Embodiments are in the field of wireless communications. More particularly, the present disclosure relates to communication of flow frames of packet flows.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments relate to packet flows, which refer to any set of frames that have common bit sequences that are duplicated in frequently transmitted frames. In several embodiments, logic may compress the uncompressed frames in accordance with flow compression rules that remove the duplicative or constant bit sequences and may communicate compressed frames that do not include the duplicative bit sequences within the packet flow. In several embodiments, the logic may generate flow frames comprising the compressed frames. Many embodiments comprise logic to generate, encode, transmit, decode, parse, and interpret flow frames after a packet flow is created. Several embodiments decompress the compressed frame based upon flow decompression rules associated with a flow index included in the flow frame.

In some embodiments, the flow frame comprises a flow frame control field, a compressed frame, and a frame sequence check. In several embodiments, the flow frame comprises a flow address field that comprises either a transmitter address (TA) or a source address (SA) depending upon the selections made in the flow creation.

In many embodiments, the first byte of the flow frame control field comprises 2 bits for a protocol version, 2 bits for a frame type, and 4 bits for a frame subtype. In some embodiments, the flow frame type of a flow frame control field is the 2 bit value 11, which is currently listed as a "reserved" frame type for the IEEE 802.11 systems. The frame subtype may be a 4 bit value 0000. In other embodiments, other values may be chosen.

In several embodiments, the second byte of the flow frame control field comprises one or more bits defined as a frame control override bit. In some embodiments, if a frame control override bit is specified during the flow creation, the value of this bit will be inserted into the uncompressed frame's frame control field. More specifically, it will be inserted into the bit position specified in the flow creation rules during flow creation of the uncompressed frame's second octet (the second byte of the frame control field).

In some embodiments, the flow frame control field may comprise a short flow index (ID). In several embodiments, the short flow ID field may be four bits in length and the short flow ID field may allow devices up to 15 receive (RX) flows and 15 transmission (TX) flows in which the flow address may be the devices medium access control (MAC) address. In many embodiments, the short flow ID is associated with flow compression rules on the transmitter side and flow decompression rules on the receiver side. In further embodiments, the short flow ID field may be set to a particular number such as 0000 to indicate the existence of a long flow ID field in the flow frame and, in some embodiments, the long flow ID field may be 2 octets.

In many embodiments, the flow frame may comprise a listener duration field to notify other "listener" devices of a network allocation vector (NAV). In some embodiments, a value of 111 in the listener duration field indicates that a 16 bit duration field is present in the flow frame. In some embodiments, a value of 000 indicates a duration value of zero. In further embodiments, the other six possible values of the listener duration field may be duration values for acknowledgement (ACK) frames transmitted at different rates. These special duration values may be for durations of compressed ACKs at lower modulation and coding scheme (MCS) values and may be for listening devices to set the NAV appropriately. In some embodiments, the intended receiver may fill in a value of zero for the duration field in accordance with a definition in the flow decompression rules.

In some embodiments, the flow frame may comprise a flow address that may be 6 octets. After the flow address, there may be an option for a long flow ID field. The long flow ID field may be 2 octets. After the flow address, all the bytes of the original frame may appear, except that the constant or duplicative bits indicated during packet flow creation in the flow compression rules are removed.

In many embodiments, the FCS field may be at the end of the flow frame. In several embodiments, the flow frame logic calculates the FCS field over the entire flow frame. Some embodiments have an option to incorporate the flow address into the FCS, in which case the flow address itself would not be included as a separate field in the flow frame. In some embodiments, the flow frame may comprise additional bits to indicate a shortened FCS field.

In some embodiments, the flow frame logic may allow a shortened flow address during flow creation. In such embodiments, the shortened flow address may be, e.g., a hash of the full flow address, or a truncation of the full flow address. Furthermore, in such embodiments, the flow frame logic may include the shortened flow address in the FCS calculation and, in several embodiments, the shortened flow address may be inserted, e.g., either at the end of the flow frame or after the flow frame control field.

In many embodiments, the flow frame logic may include the uncompressed frame's duration field after the flow frame control. This would fix the location of the duration information for listening devices.

Various embodiments may be designed to address different technical problems associated with communicating sets of frames that have common and duplicative bit sequences. For instance, some embodiments may be designed to address one or more technical problems such as generating compressed frames for packet flows.

Different technical problems such as those discussed above may be addressed by one or more different embodiments. For instance, some embodiments that communicate sets of frames that have common and duplicative bit sequences may do so by one or more different technical means such as compressing the uncompressed frame, removing duplicative bit sequences in accordance with flow compression rules to compress the uncompressed frame, appending flow frame fields, communicating a compressed frame in a flow frame format, communicating a compressed frame that does not include the duplicative bit sequences, communicating flow frames after creation of a packet flow, removing the flow frame fields, decompressing the compressed frame, and reconstructing the uncompressed frame by inserting the duplicative or constant bit sequences in accordance with flow decompression rules associated with a flow ID in the flow frame.

Some embodiments implement Institute of Electrical and Electronic Engineers (IEEE) 802.11 systems such as IEEE 802.11ah systems and other systems that operate in accordance with standards such as the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee-.org/getieee802/download/802.11-2007.pdf).

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
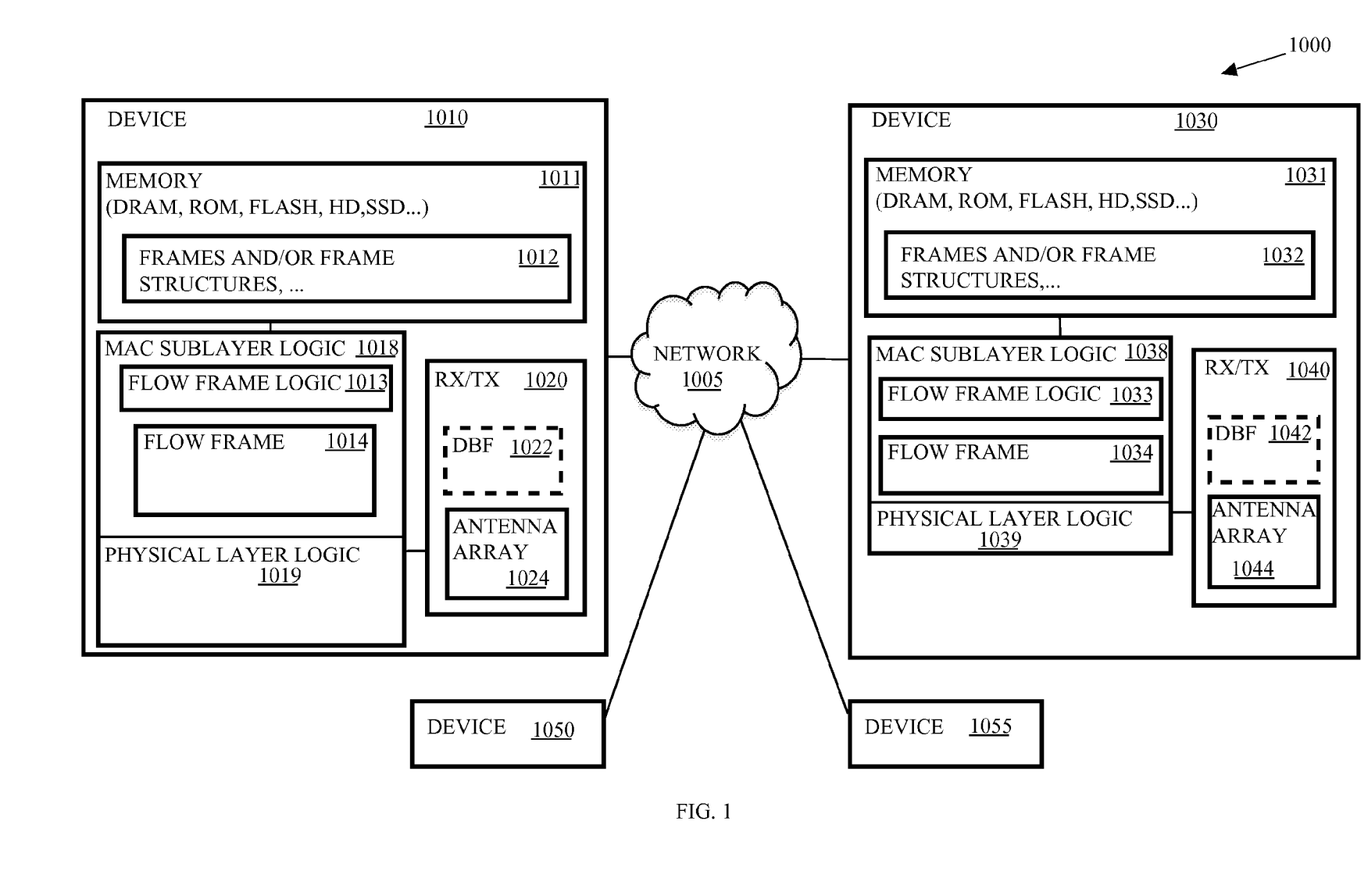
FIG. 1 depicts an embodiment of a wireless network comprising a plurality of communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, the communications device 1030 may initiate a flow based upon a number of frames to transmit from the communications device 1030 to the communications device 1010. The packet flow may have a number of bit sequences that will be repetitive or constant between the frames such as the transmission of a number of data packets. The packet flow may be associated with a flow index (ID). In some embodiments, the flow ID may be the MAC address of the communications device 1030 or another device that may be the source of the data packets. Flow frame logic 1032 of the communications device 1030 may facilitate the packet flow by compressing the uncompressed frames such as data frames of the data packets, prepending flow frame fields and calculating a new frame check sequence (FCS) field. In some embodiments, the calculation of the FCS field may involve calculating the FCS field value based upon the entire flow frame 1034, which includes the prepended flow frame fields and the compressed frame.

In several embodiments, the flow frame logic 1032 may compress the uncompressed frames by removing the duration fields, address fields, and a repetitive octet of the frame body. In some embodiments, the flow frame logic 1033 may generate a flow frame control field and a flow address field to prepend to the compressed frame to generate the flow frame 1014, may prepend the fields, and may calculate an FCS value based on the entire frame.

After generating a flow frame, the physical layer (PHY) logic 1039 may receive the flow frame 1034, encapsulate the flow frame 1034 with a preamble and transmit the flow frame via the transmit chain (TX) of the transceiver 1040.

The receive chain (RX) of the transceiver (RX/TX) 1020 may receive the transmission of the flow frame 1034, decode the flow frame 1034 and pass the decoded flow frame 1014 to the MAC sublayer logic 1018 of the communications device 1010. The flow frame logic 1013 may implement decompression rules associated with the flow frame 1014 to decompress the flow frame 1014. In particular, the flow frame logic 1013 may parse the flow frame control field to determine the content of the short frame ID. In some embodiments, the short frame ID may indicate the presence of a long frame ID so the flow frame logic 1013 may parse the long frame ID field from the flow frame 1014 to determine the frame ID. In other embodiments, the short frame ID field may comprise the ID so the flow frame logic may interpret the flow frame ID by comparing the frame ID to frame IDs in memory 1011 to determine the decompression rules for the flow frame 1014.

After determining the decompression rules for the flow frame 1014, the flow frame logic 1013 may reconstruct an uncompressed frame from the compressed frame in the flow frame 1014. For instance, the flow frame logic 1013 may add the repetitive, constant bits or bit sequences that were removed prior to transmission from the packet flow back into the compressed frame to generate an uncompressed frame. In some embodiments, adding the bits back into the compressed frame may involve adding a duration field, address fields, and part of the frame body back into the compressed frame to generate the uncompressed frame. Thereafter, the MAC sublayer logic 1018 of the communications device 1010 may parse and interpret the uncompressed frame.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as a management frame, control frame, data frame, and the like.

The MAC sublayer logic 1018, 1038 may comprise logic to implement functionality of the MAC sublayer of the data link layer of the communications device 1010, 1030. The MAC sublayer logic 1018, 1038 may generate the frames such as flow frames and the physical layer logic 1019, 1039 may generate physical layer protocol data units (PPDUs) based upon the frames. For example, the frame builder may generate frames and the flow frame logic 1013, 1033 may compress the frames and append flow frame fields to generate flow frames 1014, 1034. The physical layer logic 1019, 1039 may encapsulate the frames with preambles to generate PPDUs for transmission via a physical layer device such as the transceivers represented by receive/transmit chains (RX/TX) 1020 and 1040.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 1A:
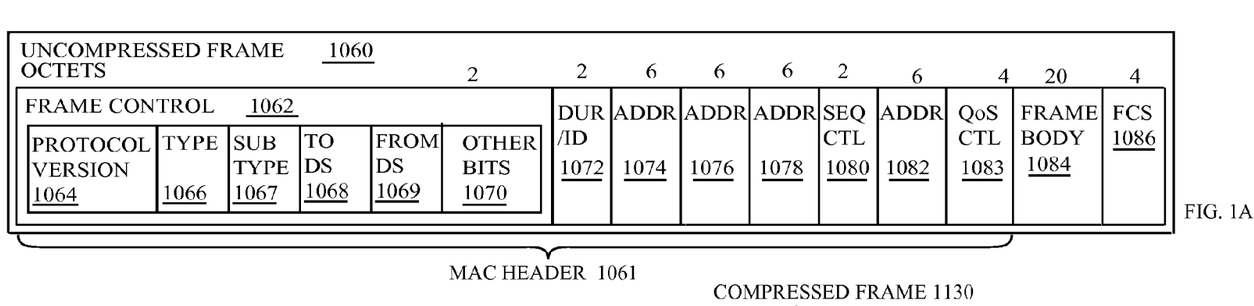
FIGS. 1A-C depict an embodiment of an uncompressed frame and alternative embodiments of flow frames.

FIG. 1A illustrates an embodiment of an uncompressed frame 1060 generated by MAC logic such as the MAC sublayer logic 1013 and 1033 in FIG. 1. In other embodiments, the frame 1060 may have more or less fields, different fields, and/or fields with different field lengths. In the embodiment illustrated in FIG. 1A, the frame 1060 comprises a MAC header 1061 followed by a frame body field 1084 and a frame check sequence (FCS) field 1086.

The MAC header 1061 may comprise the frame control field 1062, a duration/identifier (DUR/ID) field 1072, an address (ADDR) field 1074, an ADDR field 1076, an ADDR field 1078, a Sequence Control (SEQ CTL) field 1080, an optional ADDR field 1082, and a quality of service control (QoS CTL) field 1083. The frame control field 1062 may be two octets such as the standard frame and may identify the type and subtype of the frame such as a control type and ready to send (RTS) subtype.

The frame control field 1062 may comprise a protocol version field 1064, a type field 1066, a subtype field 1067, a TO DS field 1068, a FROM DS field 1069, and other frame control bits 1070. The protocol version field 1064 may be two bits in length (B0-B1). The value of the protocol version field 1064 may represent the revision of the corresponding standard that the frame represents. The type field 1066 may be two bits in length (B2-B3) and may identify the type of frame 1060 as, e.g., a management frame, a data frame, or a control frame. The subtype field 1067 may be four bits in length (B4-B7) and may identify the subtype of the frame 1060 as, e.g., a particular type of management frame, data frame, or control frame.

The TO DS field 1068 and the FROM DS field 1069 may be one bit in length each (B8-B9) and may identify information about the origin and/or destination of the frame. For instance, in some embodiments, if the value in the TO DS field 1068 is a logical zero and the value in the FROM DS field 1069 is a logical zero, the transmission may comprise a data frame transmitted direct from one station (STA) to another STA within the same independent basic service set (IBSS), a data frame transmitted direct from one non-AP STA to another non-AP STA within the same basic service set (BSS), or a management or control frame. If the value in the TO DS field 1068 is a logical one and the value in the FROM DS field 1069 is a logical zero, the transmission may comprise a data frame destined for the DS or being sent by a STA associated with an AP to the Port Access Entity in that AP. If the value in the TO DS field 1068 is a logical zero and the value in the FROM DS field 1069 is a logical one, the transmission may comprise a data frame exiting the DS or being sent by the Port Access Entity in an AP. And if the value in the TO DS field 1068 is a logical one and the value in the FROM DS field 1069 is a logical one, the transmission may comprise a data frame using the four-address format.

After the TO DS field 1068 and the FROM DS field 1069 may be other bits 1070. The other bits 1070 may be used for additional frame control field parameters such as a frame control override field if specified during the packet flow creation.

The duration/identifier (DUR/ID) field 1072 may be 16 bits (2 octets) in length. The contents of this field vary with frame type and subtype, with whether the frame is transmitted during the CFP, and with the QoS capabilities of the sending STA such as the communications device 1030. When the contents of a received Duration/ID field, treated as an unsigned integer and without regard for address values, type, and subtype (even when type or subtype contain reserved values), are less than 32 768, the duration value is used to update the network allocation vector (NAV).

The Address fields 1076, 1078, 1080, and 1082 may be used to indicate the basic service set identification (BSSID), source address (SA), destination address (DA), transmitting STA address (TA), and receiving STA address (RA). Certain frames may not contain some of the address fields. Each Address field may contain a 48-bit (6 octet) address.

One or more of the fields ADDR 1076, ADDR 1078, Sequence Control 1080, ADDR 1082, QoS control 1083, and frame body 1084 may only be present in certain frame types and subtypes of the frames. In many embodiments, however, the Sequence Control 1080 may be present in frames generated for packet flows.

The Sequence Control field 1080 is 16 bits, or 2 octets, in length and may comprise two subfields, the Sequence Number and the Fragment Number. The Sequence Number field may be a 12-bit field indicating the sequence number of an MSDU or Management Protocol Data Unit (MMPDU). STAs may assign a sequence number to each MSDU or MMPDU transmitted.

The Fragment Number field may be a 4-bit field indicating the number of each fragment of an MSDU or MMPDU. The fragment number may be set to 0 in the first or only fragment of an MSDU or MMPDU and may be incremented by one for each successive fragment of that MSDU or MMPDU. The fragment number may remain constant in all retransmissions of the fragment.

The frame body field 1084 may comprise one or more frames also referred to as MAC sublayer Service Data Units (MSDUs). The frame body 1084 may be 20 octets and may include data elements, control elements, or parameters and capabilities including some duplicative or constant bit sequences that will repeat across a number of frames generated for transmission in a packet flow. The FCS field 1086 may be four octets and may include extra checksum characters added to the frame 1060 for error detection and correction such as a cyclic redundancy check value.

Figure 1B:
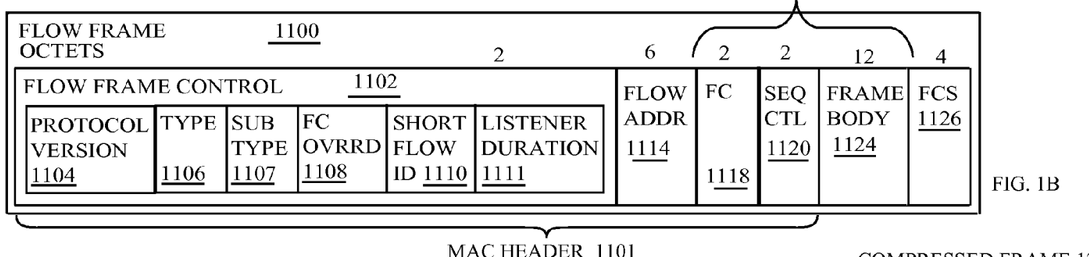
Figure 1C:
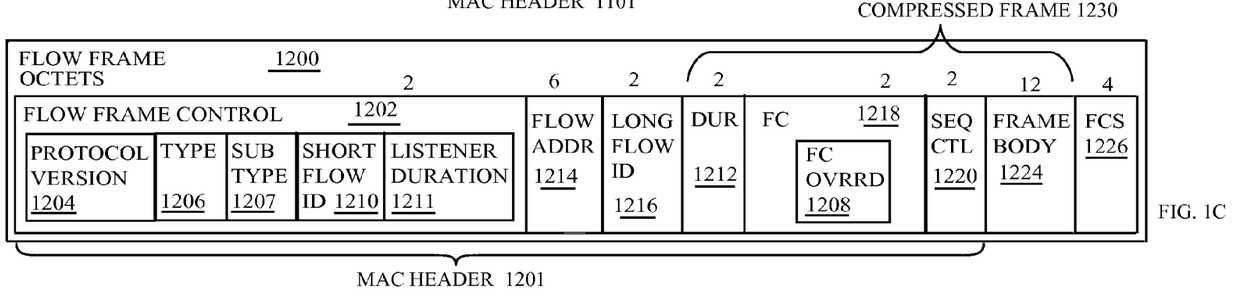

FIGS. 1B and 1C illustrate two of the many different embodiments of flow frames with compressed frames 1130 and 1230 representative of the uncompressed frame 1060 in FIG. 1A. In particular, FIG. 1B illustrates an embodiment of a flow frame 1100 encompassing a compressed frame 1130, which is generated by flow frame logic, from the uncompressed frame 1060, which is generated by MAC logic, such as the flow frame logic 1018, 1038 and the MAC sublayer logic 1013, 1033 in FIG. 1. In other embodiments, the flow frame 1100 may have more or less fields, different fields, and/or fields with different field lengths. In the present embodiment illustrated in FIG. 1B, the flow frame 1100 comprises a flow frame control field 1102, a flow address field 1114, a compressed frame control field 1118, and a sequence control field 1120 in a MAC header 1101 followed by a frame body field 1124 and a frame check sequence (FCS) field 1126.

The flow frame logic may compress the uncompressed frame 1060 by removing the duration/ID field 1072; removing the address fields 1074, 1076, 1080, and 1082; and removing the 8 octets of the frame body 1084. The flow frame logic may also prepend the flow frame control field 1102 and the flow address field 1114 to the compressed frame 1130.

The flow frame control field 1102 may comprise a protocol version field 1104, a type field 1106, a subtype field 1107, a flow control override field 1108, a short flow ID 1110, and a listener duration field 1111. The protocol version field 1104 may be two bits in length (B0-B1). The value of the protocol version field 1104 may represent the revision of the corresponding standard that the frame represents. The type field 1106 may be two bits in length (B2-B3) and may identify the type of frame 1106 as, e.g., 11 for a flow frame. The subtype field 1107 may be four bits in length (B4-B7) and may identify the subtype of the frame 1100 as, e.g., 0000 for a first type of flow frame.

The frame control override field 1108 may comprise 1 bit. The short flow ID 1110 may be 4 bits in length and may identify the frame compression and decompression rules specified at the creation of the packet flow.

The listener duration field 1111 may be 3 bits and may allow listening devices with no knowledge of the flow to set the NAV correctly. A value of 111 in the listener duration field 1111 may indicate that a duration field is present in this flow frame. In other embodiments, the logic of a listening device may store in memory the offset to the duration field. A value of 000 in the listener duration field 1111 indicates a duration value of zero. The other 6 possible values of this field may be duration values for ACK frames transmitted at different rates. These special duration values may be for durations of compressed ACKs at lower MCS values so listening devices to set the NAV appropriately. The intended receiver may fill in a value of zero for the duration field, in accordance with flow decompression rules.

After the listener duration field 1111 may be the flow address field 1114. The flow address field 1114 may be is 6 bytes long and may comprise either the TA or the SA, in accordance with the flow compression rules determined during flow creation. The flow address field 1114 may contain a 48-bit (6 octet) address.

The compressed frame 1130 may follow the flow address field 1114. In many embodiments, the compressed frame 1130 may comprise a frame control field 1118, a sequence control field 1120, and a frame body 1124. The frame control field 1114 may comprise the same values as the uncompressed frame control field 1062. The sequence control field 1120 may comprise the same values as the uncompressed sequence control field 1080. And the frame body field 1124 may comprise, e.g., the last 12 octets of the uncompressed frame body field 1084.

The FCS field 1126 may be four octets and may include extra checksum characters added to the frame 1100 for error detection and correction such as a cyclic redundancy check value. In the present embodiment, the FCS field 1126 may comprise a cyclic redundancy check value calculated based upon the entire flow frame 1100.

In further embodiments, the FCS field 1126 may be a shortened FCS field and an indication of the shortened FCS field may be included in the flow frame 1100 to inform listeners of the length of the FCS field 1126. In still further embodiments, a shortened flow address may be included in the FCS field 1126 rather than as a separate flow address field 1114. In such embodiments, the shortened flow address may be, e.g., a hash of the existing flow address or a truncation of the existing flow address. In this case, the flow address would be inserted into the FCS calculation, e.g., at the end of the frame or after the flow frame control field 1102.

FIG. 1C illustrates an alternative embodiment of a flow frame 1200 encompassing a compressed frame 1230 of the uncompressed frame 1060 generated by MAC logic such as the flow frame logic 1018, 1038 and the MAC sublayer logic 1013, 1033 in FIG. 1. In the present embodiment illustrated in FIG. 1C, the flow frame 1200 comprises a flow frame control field 1202, a flow address field 1214, a long flow ID 1216, a duration field 1212, a frame control field 1218, and a sequence control field 1220 in a MAC header 1201 followed by a frame body field 1224 and a frame check sequence (FCS) field 1226.

The flow frame logic may compress the uncompressed frame 1060 by removing the address fields 1074, 1076, 1080, and 1082; and removing the 8 bits of the frame body 1084. The flow frame logic may also prepend the flow frame control field 1202 and the flow address field 1214 to the compressed frame 1230.

The flow frame control field 1202 may comprise a protocol version field 1204, a type field 1206, a subtype field 1207, a short flow ID 1210, and a listener duration field 1211. The protocol version field 1204 may be two bits in length (B0-B1). The value of the protocol version field 1204 may represent the revision of the corresponding standard that the frame represents. The type field 1206 may be two bits in length (B2-B3) and may identify the type of frame 1206 as, e.g., 11 for a flow frame. The subtype field 1207 may be four bits in length (B4-B7) and may identify the subtype of the frame 1200 as, e.g., 0000 for a first type of flow frame.

The short flow ID 1210 may comprise four bits such as 0000 to indicate the presence of the long flow ID field 1216 in the flow frame 1200.

The listener duration field 1211 may be 3 bits and may allow listening devices with no knowledge of the flow to set the NAV correctly. In the present embodiment, the listener duration field 1211 may comprise a value of 111 to indicate that a duration field 1212 is present in this flow frame. In many embodiments, the duration field 1212 may be the first two bytes of the compressed frame data. In other embodiments, the duration field 1212 may follow immediately after the flow control frame 1202. In further embodiments, the logic of a listening device may know the offset to the duration field.

After the listener duration field 1211 may be the flow address field 1214. The flow address field 1214 may be is 6 octets and may comprise a TA or SA, in accordance with the flow compression rules determined during flow creation.

In the present embodiments, a long flow ID 1216 follows the flow address field 1214. The long flow ID 1216 may be 2 octets and may comprise an index for flow frames to associate the flow frames with a compression and decompression rules determined at the creation of the packet flow.

The duration field 1212 may comprise the uncompressed frame's 1060 duration field 1072. The duration/identifier (DUR/ID) field 1212 may be 2 octets and may comprise a duration value that is used to update the network allocation vector (NAV) in listening devices such as the communications devices 1050 and 1055.

The frame control field 1218 may be the same frame control field 1062 of the uncompressed frame 1060. In the present embodiment, however, the override bit may be specified during the flow creation an, as a result be generated in the uncompressed frame 1060 in, e.g., other bits 1070. The frame control override field 1208 may comprise 1 bit.

The Sequence Control field 1220 may be 2 octets and may comprise two subfields, the Sequence Number and the Fragment Number. These two fields may have the same values as the corresponding fields in the uncompressed frame 1060.

The frame body field 1224 may comprise one or more MSDUs. The frame body 1224 may be 12 octets and may include data elements, control elements, or parameters and capabilities without the duplicative or constant bit sequences from the uncompressed frame 1060.

The FCS field 1226 may be four octets and may include extra checksum characters added to the frame 1100 for error detection and correction such as a cyclic redundancy check value. In the present embodiment, the FCS field 1226 may comprise a cyclic redundancy check value calculated based upon the entire lo frame 1200.

Figure 2:
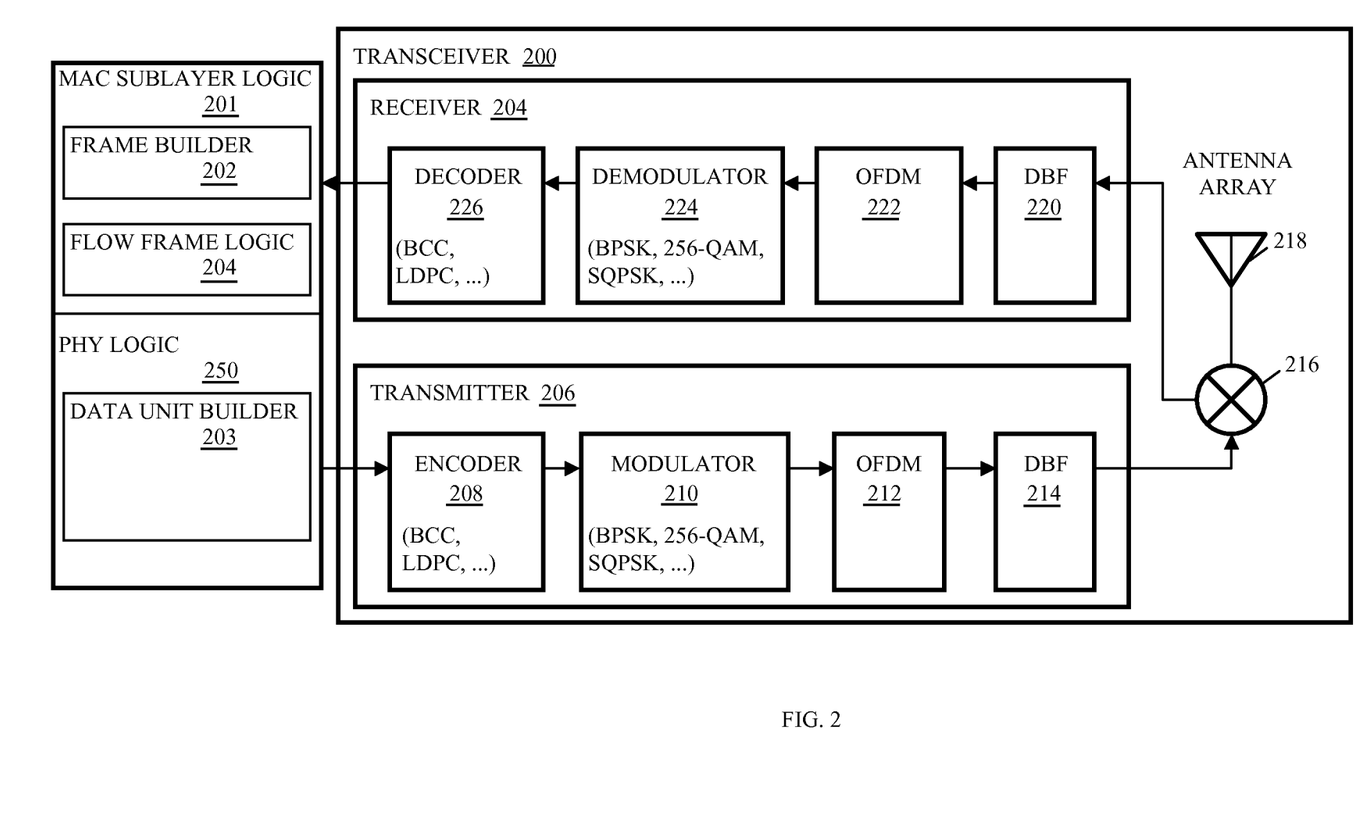
FIG. 2 depicts an embodiment of an apparatus to generate, transmit, receive and interpret a flow frame.

FIG. 2 depicts an embodiment of an apparatus to generate, transmit, receive, and interpret or decode frames such as the flow frames 1100 and 1200 illustrated in FIGS. 1B-C. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200.

In many embodiments, the MAC sublayer logic 201 may comprise a frame builder 202 coupled with flow frame logic 204 to generate frames such as one of the flow frames 1100 and 1200 illustrated in FIGS. 1B-C. The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU or more than one MPDUs, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames such as the flow frames 1100 and 1200 illustrated in FIGS. 1B-C and decompress the compressed frames included in the MPDU(s).

Figure 3A:
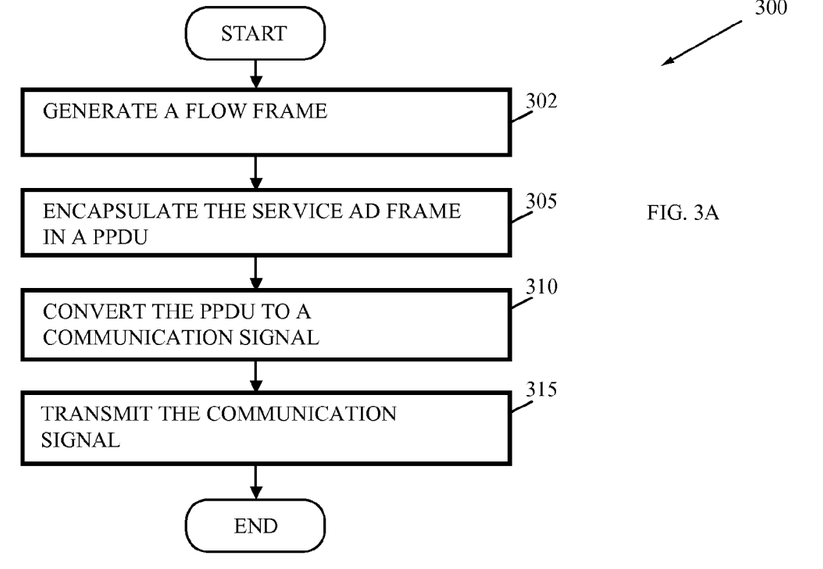
FIGS. 3A-B depict embodiments of flowcharts to generate, transmit, receive, parse, and interpret communications with flow frames.
Figure 3B:
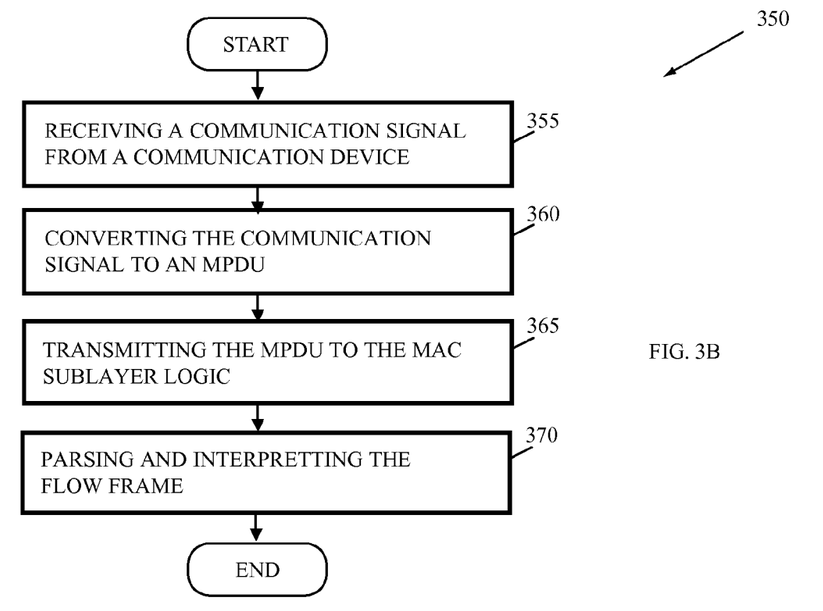

FIGS. 3A-B depict embodiments of flowcharts 300 and 350 to transmit, receive, and interpret or decode communications with a flow frame such as the flow frames 1100 and 1200 illustrated in FIGS. 1B-C. Referring to FIG. 3A, the flowchart 300 may begin with generating a flow frame (element 302) in MAC logic of a communications device such as the communications device 1030 illustrated in FIG. 1. Flow frame logic of the communications device may facilitate the packet flow by compressing the uncompressed frames, prepending flow frame fields, and calculating the frame check sequence (FCS) field. In some embodiments, the flow frame logic may compress the uncompressed frames by removing the duration fields, address fields, and duplicative bit sequences in the frame body. In some embodiments, the flow frame logic may generate a flow frame control field and a flow address field to prepend to the compressed frame to generate the flow frame.

The flow frame logic may generate the flow frame may comprising a flow frame control field that identifies the frame as a flow frame type and a flow frame subtype, identifies the compressing rules followed to compress the uncompressed frame via a flow index, and identifies a duration or another field with the duration in the flow frame. Thereafter, the flow address may indicate the address of the source of the flow frame or the transmitter that is to transmit the flow frame.

The flow frame logic may also insert the compressed frame followed by the FCS field. In many embodiments, the flow frame logic may calculate the FCS field by hashing or otherwise calculating the FCS field value based upon the entire flow frame.

After the MAC logic generates the flow frame, the physical layer logic may receive the flow frame. The MAC logic of the communications device may pass the frame as an MPDU to a data unit builder that transforms the data into a packet that can be transmitted to a station. The data unit builder may generate a preamble to encapsulate one or more of the MPDUs from the frame builder to form a PPDU for transmission (element 305).

The PPDU may then be transmitted to the physical layer device such as the transmitter 206 in FIG. 2 or the transceiver 1020, 1040 in FIG. 1 so the PPDU may be converted to a communication signal (element 310). The transmitter may then transmit the communication signal via the antenna (element 315).

Referring to FIG. 3B, the flowchart 350 begins with a receiver of a station such as the receiver 204 in FIG. 2 receiving a communication signal via one or more antenna (s) such as an antenna element of antenna array 218 (element 355). The receiver may convert the communication signal into one or more MPDUs in accordance with the process described in the preamble (element 360). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 360) and transmits the one or more MPDUs to MAC sublayer logic such as MAC sublayer logic 202 (element 365).

The MAC sublayer logic may decode the flow frame in each of the MPDUs. For instance, the MAC sublayer logic may parse the flow frame to determine the compressed frame and reconstruct the compressed frame based on decompression rules associated with a flow index in the flow frame.

In many embodiments, parsing the flow frame may comprise parsing a flow frame control field to determine a flow index and parsing the compressed frame. Parsing the compressed frame may comprise parsing a frame control field, a sequence control field and a compressed frame body. Several embodiments further comprise parsing a flow address field, wherein the flow address field comprises a transmitter address or a source address. And further embodiments comprise parsing a long flow index field, wherein a short flow index field of the flow frame control field comprises a value indicative of the presence of the long flow index field.

Interpreting the flow frame may involve comparing the values of the compressed frame with values in memory. For instance, interpreting the flow frame may involve comparing the flow frame control type with the flow type 11 to determine that the frame is a flow frame. Interpreting the flow frame may involve comparing the flow frame control subtype with the flow subtype 0000 to determine that the frame is a subtype of the flow frame. Interpreting the short flow ID may comprise looking up the ID in, e.g., a data structure such as short flow ID list, in memory to determine the decompression rules associated with the flow frame. And interpreting the flow frame may involve comparing the long flow ID with a list of long flow IDs in memory to determine the decompression rules associated with the flow frame.

The following examples pertain to further embodiments. One example comprises a method. The method may involve generating, by a medium access control logic, the flow frame comprising: determining a flow frame control field; determining a compressed frame, the compressed frame comprising a frame control field, a sequence control field and a compressed frame body; and determining a frame check sequence.

In some embodiments, the method may further comprise encapsulating, by physical layer logic, the flow frame with a preamble to create a physical layer protocol data unit to transmit. In some embodiments, the method may further comprise transmitting, via an antenna, the flow frame. In many embodiments, the method may further comprise determining a flow address field, wherein the flow address field comprises a transmitter address or a source address. In several embodiments, the method may further comprise determining a long flow index field, wherein a short flow index field of the flow frame control field comprises a value indicative of the presence of the long flow index field. In several embodiments, determining the flow frame control field comprises determining a protocol version field, a frame type field, and a frame subtype field. In several embodiments, determining the compressed frame comprises removing constant bit sequences in accordance with flow compression rules associated with a flow index of the flow frame. And, in some embodiments, determining the frame check sequence comprises determining a hash value of the flow frame as a whole.

Another example comprises an apparatus. The apparatus may comprise a memory; a medium access control logic coupled with the memory to generate the flow frame comprising by operations to determine a flow frame control field; to determine a compressed frame, the compressed frame comprising a frame control field, a sequence control field and a compressed frame body; and to determine a frame check sequence.

In some embodiments, the apparatus may further comprise physical layer logic coupled with the medium access control logic to encapsulate the flow frame with a preamble to create a physical layer protocol data unit to transmit. In some embodiments, the apparatus may further comprise an antenna coupled with the physical layer logic to transmit the flow frame. In some embodiments, the medium access control logic comprises logic to determine a flow address field, wherein the flow address field comprises a transmitter address or a source address. In some embodiments, the medium access control logic comprises logic to determine a long flow index field, wherein a short flow index field of the flow frame control field comprises a value indicative of the presence of the long flow index field. In some embodiments, the medium access control logic comprises logic to determine a protocol version field, a frame type field, and a frame subtype field. In some embodiments, the medium access control logic comprises logic to determine the compressed frame comprises removing constant bit sequences in accordance with flow compression rules associated with a flow index of the flow frame. And in some embodiments of the apparatus, the medium access control logic comprises logic to determine a hash value of the flow frame as a whole to determine the frame check sequence field.

Another example comprises a system. The system may comprise a physical layer logic to encapsulate the flow frame with a preamble; a memory; and a medium access control logic coupled with the memory to generate the flow frame comprising by operations to determine a flow frame control field; to determine a compressed frame, the compressed frame comprising a frame control field, a sequence control field and a compressed frame body; and to determine a frame check sequence.

Another example comprises a method. The method may involve decoding, by a physical layer logic, the flow frame; parsing a flow frame control field; parsing a compressed frame, the compressed frame comprising a frame control field, a sequence control field and a compressed frame body; and reconstructing an uncompressed frame based on the compressed frame and the flow index.

In some embodiments, the method may further comprise receiving, via an antenna, the flow frame. In some embodiments, the method may further comprise parsing a flow address field, wherein the flow address field comprises a transmitter address or a source address. In many embodiments, the method may further comprise parsing a long flow index field, wherein a short flow index field of the flow frame control field comprises a value indicative of the presence of the long flow index field. In several embodiments, the method may further comprise parsing a long flow index field, wherein a short flow index field of the flow frame control field comprises a value indicative of the presence of the long flow index field. In several embodiments, parsing the flow frame control field comprises parsing a protocol version field, a frame type field, and a frame subtype field. In several embodiments, parsing the compressed frame comprises parsing the compressed frame body, the compressed frame body comprising twelve bits that are not constant in frames of the packet flow. And, in some embodiments, parsing the frame check sequence comprises parsing a hash value of the flow frame as a whole.

Another example comprises an apparatus. The apparatus may comprise a physical layer logic to decode the flow frame; a medium access control logic coupled with the memory to receive a flow frame comprising logic to parse a flow frame control field; parse a compressed frame, the compressed frame comprising a frame control field, a sequence control field and a compressed frame body; and to reconstruct an uncompressed frame based on the compressed frame and the flow index.

In some embodiments, the apparatus may further comprise an antenna coupled with the physical logic to receive the flow frame. In some embodiments, the medium access control logic may comprise logic to parse a flow address field, wherein the flow address field comprises a transmitter address or a source address. In some embodiments, the medium access control logic comprises logic to parse a long flow index field, wherein a short flow index field of the flow frame control field comprises a value indicative of the presence of the long flow index field. In some embodiments, the medium access control logic comprises logic to parse a protocol version field, a frame type field, and a frame subtype field. In some embodiments, the medium access control logic comprises logic to parse the compressed frame body, the compressed frame body comprising twelve bits that are not constant in frames of the packet flow. And in some embodiments of the apparatus, the medium access control logic comprises logic to parse a hash value of the flow frame as a whole to determine the frame check sequence field.

Another example comprises a program product. The program product to parse a flow frame for a packet flow may comprise a storage medium comprising instructions to be executed by a processor-based device, wherein the instructions, when executed by the processor-based device, perform operations, the operations comprising: decoding, by a physical layer logic, the flow frame; parsing a flow frame control field; parsing a compressed frame, the compressed frame comprising a frame control field, a sequence control field and a compressed frame body; and reconstructing an uncompressed frame based on the compressed frame and the flow index.

In some embodiments, the operations may further comprise parsing a flow address field, wherein the flow address field comprises a transmitter address or a source address. In many embodiments, the operations may further comprise parsing a long flow index field, wherein a short flow index field of the flow frame control field comprises a value indicative of the presence of the long flow index field. In several embodiments, the operations may further comprise parsing a long flow index field, wherein a short flow index field of the flow frame control field comprises a value indicative of the presence of the long flow index field. In several embodiments, parsing the flow frame control field comprises parsing a protocol version field, a frame type field, and a frame subtype field. In several embodiments, parsing the compressed frame comprises parsing the compressed frame body, the compressed frame body comprising twelve bits that are not constant in frames of the packet flow. And, in some embodiments, parsing the frame check sequence comprises parsing a hash value of the flow frame as a whole.

Another example comprises a program product. The program product to generate a flow frame for a packet flow may comprise a storage medium comprising instructions to be executed by a processor-based device, wherein the instructions, when executed by the processor-based device, perform operations, the operations comprising: generating, by a medium access control logic, the flow frame comprising: determining a flow frame control field; determining a compressed frame, the compressed frame comprising a frame control field, a sequence control field and a compressed frame body; and determining a frame check sequence.

In some embodiments, the operations may further comprise determining a flow address field, wherein the flow address field comprises a transmitter address or a source address. In many embodiments, the operations may further comprise determining a long flow index field, wherein a short flow index field of the flow frame control field comprises a value indicative of the presence of the long flow index field. In several embodiments, the operations may further comprise determining a long flow index field, wherein a short flow index field of the flow frame control field comprises a value indicative of the presence of the long flow index field. In several embodiments, determining the flow frame control field comprises determining a protocol version field, a frame type field, and a frame subtype field. In several embodiments, determining the compressed frame comprises removing constant bit sequences in accordance with flow compression rules associated with a flow index of the flow frame. And, in some embodiments, determining the frame check sequence comprises determining a hash value of the flow frame as a whole.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method to generate wireless communications flow frames to transmit during a packet flow, the method comprising:
    generating, by a medium access control logic, the wireless communications flow frames in more than one packet of the packet flow, after creation of the packet flow, wherein one or more duplicative bit sequences that are indicated during creation of the packet flow are not included within the wireless communications flow frames transmitted in the more than one packet of the packet flow, wherein generation of each of the wireless communications flow frames comprises:
        determining a flow frame control field to identify each of the wireless communications flow frames as a flow frame associated with the packet flow;
        determining a frame check sequence for each of the wireless communications flow frames;
        determining a compressed frame for each of the wireless communications flow frames in the more than one packet, the compressed frame comprising a frame control field, a sequence control field and a frame body; and
        wherein determining the compressed frame comprises generating the compressed frame by excluding or removing the one or more duplicative bit sequences in accordance with flow compression rules associated with a flow index; and
    transmitting, via one or more antennas, the compressed frame of each of the wireless communications flow frames.

2. The method of claim 1, further comprising forming, by physical layer logic, the wireless communications flow frames with preambles to create physical layer protocol data units.

3. The method of claim 1, wherein determining the compressed frame without the one or more duplicative bit sequences determined during creation of the packet flow comprises determining the compressed frame without one or more addresses determined during the creation of the packet flow.

4. The method of claim 1, further comprising determining a long flow index field, wherein a short flow index field of the flow frame control field comprises a value indicative of the presence of the long flow index field.

5. The method of claim 1, wherein determining the flow frame control field comprises determining a protocol version field, a frame type field, and a frame subtype field.

6. A device to generate wireless communication flow frames to transmit during a packet flow, the device comprising:
    a memory; and
    a processor to implement medium access control logic, coupled with the memory configured to:
        generate the wireless communications flow frames in more than one packet of the packet flow, after creation of the packet flow, wherein one or more duplicative bit sequences that are indicated during creation of the packet flow are not included within the wireless communications flow frames transmitted in the more than one packet of the packet flow, wherein generation of each of the wireless communications flow frames comprises operations to determine a flow frame control field to identify each of the wireless communications flow frames as a flow frame associated with the packet flow;
        determine a compressed frame for each of the wireless communications flow frames, the compressed frame comprising a frame control field, a sequence control field and a frame body; and to determine a frame check sequence for each of the wireless communications flow frames;
        wherein determine the compressed frame comprises generating the compressed frame by excluding or removing the one or more duplicative bit sequences in accordance with flow compression rules associated with a flow index; and
        transmit, via one or more antennas coupled with the physical layer logic, the compressed frame of the wireless communications flow frames.

7. The device of claim 6, further comprising physical layer logic coupled with the medium access control logic to form the wireless communications flow frames with preambles to create physical layer protocol data units.

8. The device of claim 6, wherein the medium access control logic comprises logic to determine the compressed frame without the one or more duplicative bit sequences determined during creation of the packet flow, wherein the one or more duplicative bit sequences comprises an address.

9. The device of claim 6, wherein the medium access control logic comprises logic to determine a long flow index field, wherein a short flow index field of the wireless communications flow frame control field comprises a value indicative of the presence of the long flow index field.

10. The device of claim 6, wherein the medium access control logic comprises logic to determine a protocol version field, a frame type field, and a frame subtype field.

11. A method to decompress a compressed wireless communications frames from a wireless communications flow frames for a packet flow, the method comprising:
receiving, via one or more antennas, the wireless communications flow frames after creation of the packet flow in more than one packet of the packet flow, wherein one or more duplicative bit sequences determined during creation of the packet flow are excluded or removed in accordance with flow compression rules associated with a flow index from the wireless communications flow frames in each of the more than one packet;
parsing, by a medium access control logic, a flow frame control field to determine that the frames are the wireless communications flow frames associated with the packet flow;
parsing, by the medium access control logic, the wireless communications flow frames, each comprising a frame control field, a sequence control field, a frame body, and a frame check sequence; and
reconstructing, by the medium access control logic, uncompressed frames based on the wireless communications flow frames in the more than one packet and on the one or more duplicative bit sequences.

12. The method of claim 11, wherein reconstructing the uncompressed frame comprises adding the one or more bit sequences, wherein the one or more duplicative bit sequences comprises an address.

13. The method of claim 11, further comprising parsing a long flow index field, wherein a short flow index field of the flow frame control field comprises a value indicative of the presence of the long flow index field.

14. A device to decompress compressed frames in wireless communications flow frames for a packet flow, the device comprising:
a physical layer device to decode the wireless communications flow frames;
a processor to implement medium access control logic, coupled with a memory configured to:
receive the wireless communications flow frames in more than one packet of the packet flow after creation of the packet flow,
wherein one or more duplicative bit sequences determined during creation of the packet flow are excluded or removed in accordance with flow compression rules associated with a flow index from each of the wireless communications flow frames in the more than one packet, the medium access control logic comprising logic:
to parse the wireless communications flow frames, each of the wireless communications flow frames comprising a frame control field to determine that the frames are the wireless communications flow frames, a sequence control field, a frame body, and a frame check sequence; and
reconstruct uncompressed frames based on the wireless communications flow frames in the more than one packet and the one or more duplicative bit sequences.

15. The device of claim 14, further comprising an antenna coupled with the physical layer device to receive the wireless communications flow frames.

16. The device of claim 14, wherein the medium access control logic comprises logic to parse a flow address field, wherein the flow address field comprises a transmitter address or a source address.

17. The device of claim 14, wherein the medium access control logic comprises logic to parse a long flow index field, wherein a short flow index field of the wireless communications flow frame control field comprises a value indicative of the presence of the long flow index field.

18. A machine-accessible product comprising:
a non-transitory medium containing instructions to decompress compressed frames from wireless communications flow frames for a packet flow, wherein the instructions, when executed by a station, causes the station to perform operations, the operations comprising:
receiving the wireless communications flow frames in more than one packet of a packet flow after creation of the packet flow, wherein one or more duplicative bit sequences determined during creation of the packet flow are excluded or removed in accordance with flow compression rules associated with a flow index from the wireless communications flow frames;
parsing, by the medium access control logic, the wireless communications flow frames, each of the wireless communications flow frames comprising a frame control field, a sequence control field, a frame body, and a frame check sequence; and
reconstructing, by the medium access control logic, uncompressed frames based on the wireless communications flow frames and on the one or more duplicative bit sequences.

19. The machine accessible product of claim 18, wherein the operations further comprise parsing a flow address field, wherein the flow address field comprises a transmitter address or a source address.

20. The machine accessible product of claim 18, wherein the operations further comprise parsing a long flow index field, wherein a short flow index field of the flow frame control field comprises a value indicative of the presence of the long flow index field.

21. A machine-accessible product comprising:
a non-transitory medium containing instructions to generate wireless communications flow frames to transmit in more than one packet during a packet flow, wherein the instructions, when executed by a station, causes the station to perform operations, the operations comprising:
generating, by a medium access control logic, the wireless communications flow frames in the more than one packet, after creation of the packet flow, wherein one or more duplicative bit sequences that are indicated during creation of the packet flow are not included within the wireless communications flow frames transmitted in the more than one packet during the packet flow, wherein generation of each of the wireless communications flow frames comprises:

determining a flow frame control field to identify each of the wireless communications flow frames as flow frames associated with the packet flow;

determining a compressed frame for each of the wireless communications flow frames in the more than one packet, the compressed frame comprising a frame control field, a sequence control field and a compressed frame body; and determining a frame check sequence for each of the wireless communications flow frames in the more than one packet;

wherein determining the compressed frame comprises generating the compressed frame by excluding or removing the one or more duplicative bit sequences in accordance with flow compression rules associated with a flow index; and transmitting, via one or more antennas, the compressed frame of each of the wireless communications flow frames.

22. The machine accessible product of claim 21, wherein the operations further comprise determining a flow address field, wherein the flow address field comprises a transmitter address or a source address.

23. The machine accessible product of claim 21, wherein determining the compressed frame comprises removing the one or more duplicative bit sequences in accordance with flow compression rules associated with a flow index of the wireless communications flow frames.

24. The method of claim 1, wherein determining the frame check sequence comprises determining a hash value of each of the wireless communications flow frames as a whole.

25. The device of claim 6, wherein the medium access control logic comprises logic to determine hash values of each of the wireless communications flow frames as a whole to determine the frame check sequence field.

* * * * *